UNITED STATES PATENT OFFICE.

KARL SCHIRMACHER AND BERNHARD DEICKE, OF HÖCHST-ON-THE-MAIN, GERMANY, ASSIGNORS TO FARBWERKE VORM. MEISTER, LUCIUS & BRÜNING, OF HÖCHST-ON-THE-MAIN, GERMANY, A CORPORATION OF GERMANY.

VAT-DYESTUFF.

No. 867,305.   Specification of Letters Patent.   Patented Oct. 1, 1907.

Application filed January 26, 1907. Serial No. 354,166.

*To all whom it may concern:*

Be it known that we, KARL SCHIRMACHER, Ph. D., and BERNHARD DEICKE, Ph. D., chemists, citizens of the Empire of Germany, residing at Höchst-on-the-Main, Germany, have invented certain new and useful Improvements in Vat-Dyestuffs, of which the following is a specification.

The object of this invention is the improvement in vat dyestuffs having the general formula:—

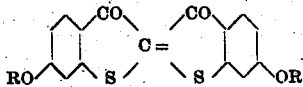

wherein "R" means ethyl and methyl.

These dyestuffs may be obtained by oxidizing oxythionaphthene derivatives resulting from heating alkyloxyphenylthioglycollic-o-carboxylic acids

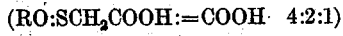

$(RO:SCH_2COOH:=COOH\ 4:2:1)$ with alkalies.

The new dyestuffs are yellow-red powders insoluble in water. They are little soluble in hot alcohol, glacial acetic acid, benzene and chloroform with a yellow-red and in concentrated sulfuric acid with a red-blue color. When heated with concentrated hydrochloric acid alkyl chlorids are split off. With alkaline hydrosulfite they yield yellow colored vats dyeing wool and cotton beautiful yellow-red tints.

The process for obtaining the new dyestuffs is, for instance, as follows:—

Example: 12.3 parts by weight of meta-amino-para-cresol $(OH:NH_2:CH_3=4:2:1)$ are heated with 40 parts by weight of glacial acetic acid for 10 hours. When cold the acetyl-compound separates; it is isolated by filtering and washing with little water. 16.5 parts by weight of this acetyl-meta-amino-para-cresol are then stirred with 30 parts of alcohol, a solution of 5.6 parts by weight of caustic potash in 50 parts by weight of alcohol added in the cold and after addition of 15.6 parts by weight of ethyl iodid the whole is heated for 3—4 hours on the water bath. The 2-acetylamino-4-cresolethylether separating after partly distilling the alcohol may be crystallized from water as long needles. 19.3 parts of this acetylaminocresolethylether $(C_2H_5O:NHAc:CH_3=4:2:1)$ are dissolved in water to which are gradually added while stirring at 70—80° C. 35 parts by weight of permanganate. After the disappearance of the permanganate and after filtration the 4-ethoxy-2-acetaminobenzoic acid is separated from the solution by hydrochloric acid.

To transform into 4-ethoxyphenylthioglycollic-o-carboxylic acid 22.3 parts by weight of 4-ethoxy-2-acetaminobenzoic acid are boiled, till hydrochloric acid precipitates no more unchanged acetyl compound, with a not too diluted solution of 35 parts of caustic soda-lye of 40° Bé. specific gravity in order to eliminate the acetyl; after acidifying there are added in the cold 20 parts of hydrochloric acid of about 20° Bé. and 7 parts by weight of nitrite. The diazo solution thus obtained is run into a solution of 18 parts by weight of potassium xanthogenate and 25 parts by weight of sodium carbonate at about 25—30° C. and when the evolution of nitrogen has ceased 15 parts by weight of sodium chloracetate and 25 parts by weight of caustic soda-lye of about 40° Bé. specific gravity are added and the whole is heated to boiling for about 2 hours. It is allowed to cool and the 4-ethyloxyphenylthioglycollic-o-carboxylic acid

$(C_2H_5:O:SCH_2COOH:COOH=4:2:1)$ is then separated by adding a mineral acid. It is a white powder soluble with difficulty in cold water.

To obtain 4-ethoxy-oxythionaphthene-carboxylic acid 20 parts by weight of 4-ethoxyphenylthioglycollic-o-carboxylic acid are heated for some time to 180—200° C. with a mixture of 120 parts by weight of caustic soda and 12 parts by weight of water. The fusion becomes gradually yellowish and brittle. When cold it is dissolved in water and the 4-ethoxy-oxythionaphthene-carboxylic acid is precipitated with a mineral acid as a white voluminous mass. It is soluble in acetates and alkalies, yielding, when treated with hydrochloric acid and nitrite, a characteristic nitroso-compound crystallizing from water in yellow needles. On boiling the 4-ethoxy-oxythionaphthene-carboxylic acid with hydrochloric acid the 4-ethoxy-oxythionaphthene is obtained being volatile with steam and crystallizing in white needles.

The dyestuff is obtained from the 4-ethoxy-oxythionaphthene-carboxylic acid by dissolving, for instance, 23 parts by weight of this acid with 25 parts of caustic soda-lye of 40° Bé. specific gravity in 1000 parts by weight of water, adding at a gentle heat a solution of potassium ferricyanid till no further dyestuff is formed.

The dyestuff separates in yellow-red flakes and may be isolated by filtration and washing with water. By dissolving in alkaline hydrosulfite and again precipitating by oxidation with air the dyestuff may be purified. It has the properties above mentioned.

If for the 4-ethoxy-oxythionaphthene-carboxylic acid be substituted the 4-methoxy-acid, obtained in an analogous manner, a dyestuff is produced of very similar properties.

Having now described our invention, what we claim is:

As products the vat dyestuffs whose composition corresponds to the formula:

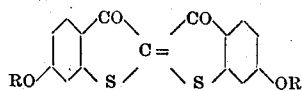

wherein "R" means ethyl and methyl, being yellow-red powders, insoluble in water, little soluble in hot alcohol, benzene, acetic acid and chloroform with a yellow-red color, soluble in concentrated sulfuric acid with a red-blue color, splitting off when heated with hydrochloric acid alkyl chlorids, dissolving in an alkaline hydro-sulfite solution with a yellow color to a vat, dyeing wool and cotton yellow-red tints.

In testimony, that we claim the foregoing as our invention, we have signed our names in presence of two subscribing witnesses.

KARL SCHIRMACHER.
BERNHARD DEICKE.

Witnesses:
JEAN GRUND,
CARL GRUND.